INVENTORS
Donald E. Graham
George Q. Neyhouse
BY
Richard G. Stahr
THEIR ATTORNEY June 4, 1968   D. E. GRAHAM ET AL   3,387,196
SPEED CONTROL SYSTEM FOR ALTERNATING CURRENT INDUCTION MOTORS
Filed Oct. 7, 1965   3 Sheets-Sheet 3

10, 130 & 250
ELECTRICAL DEGREES 30, 150 & 270
ELECTRICAL DEGREES 60, 180 & 300
ELECTRICAL DEGREES 90, 210 & 330
ELECTRICAL DEGREES 70, 190 & 310
ELECTRICAL DEGREES

INVENTORS
Donald E. Graham
George O. Neyhouse
BY
Richard G. Stahr
THEIR ATTORNEY United States Patent Office 3,387,196
Patented June 4, 1968

3,387,196
SPEED CONTROL SYSTEM FOR ALTERNATING CURRENT INDUCTION MOTORS
Donald E. Graham and George A. Neyhouse, Dayton, Ohio, assignors to General Motors Corporation, Detroit, Mich., a corporation of Delaware
Filed Oct. 7, 1965, Ser. No. 493,652
7 Claims. (Cl. 318—227)

ABSTRACT OF THE DISCLOSURE

A speed control system for alternating current induction motors wherein a direct current reference potential, obtained by rectifying one of the phases of the alternating current supply potential, is compared with a direct current control potential which is a function of motor speed and which may be selectively varied in magnitude to change the speed of the motor. Additional circuitry including an unijunction transistor type relaxation oscillator is responsive to a difference in magnitude between these two potentials to produce a trigger signal at the electrical angle of each potential cycle of each phase of the alternating current supply potential as determined by the difference. The trigger signals are applied across the control electrode-cathode electrodes of respective silicon controlled rectifiers, each corresponding to a phase of the alternating current supply potential, for triggering these devices conductive to complete an energizing circuit for the corresponding phase windings.

---

Figure 1:
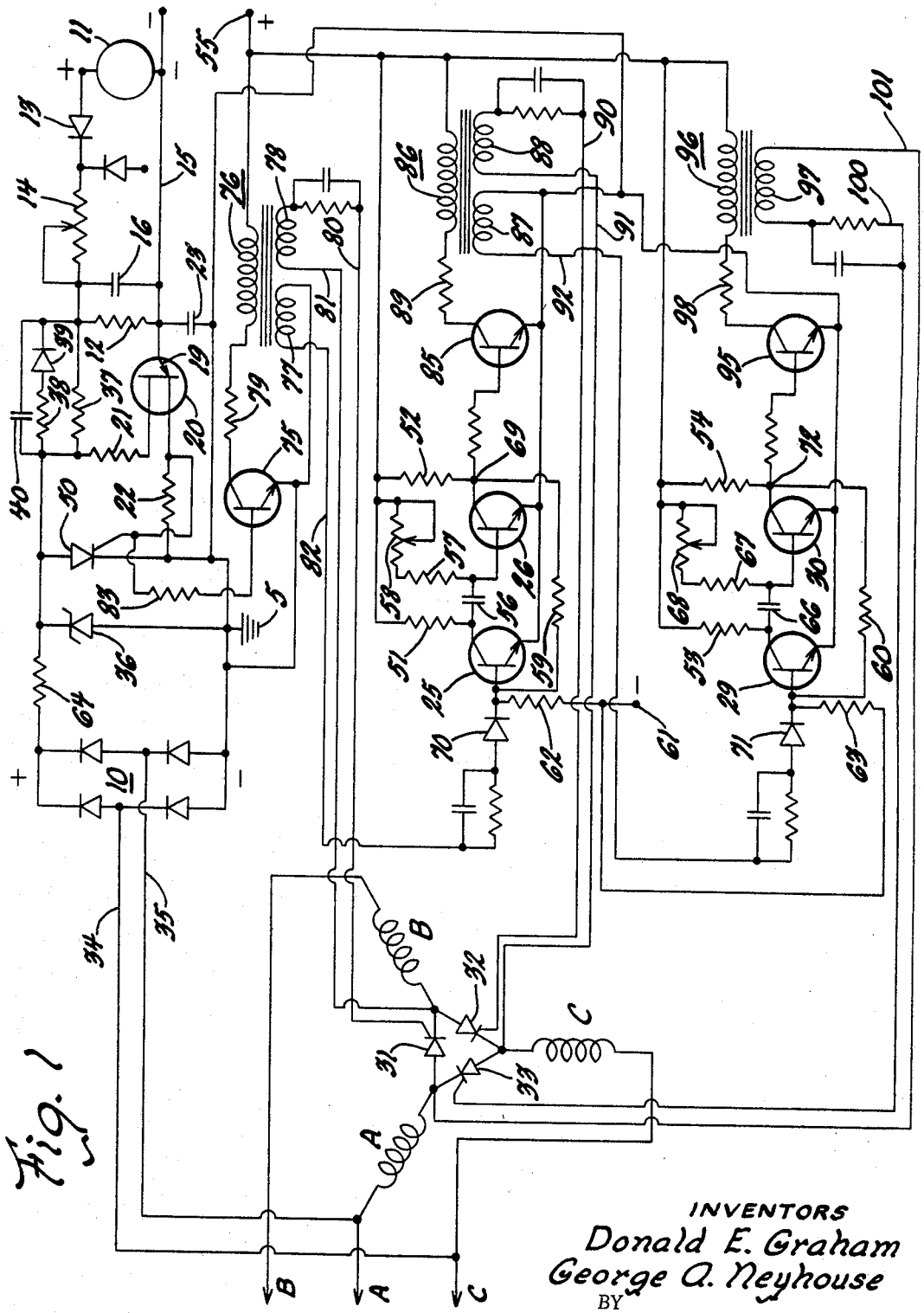

The present invention relates to motor speed control systems and, more specifically, to a speed control system for alternating current induction motors.

Alternating current induction motors have discrete phase windings corresponding to each phase of a compatible alternating current supply potential which are energized by the phase of the alternating current supply potential to which they correspond. Single phase motors have one phase winding which may be connected across a single phase alternating current line, two phase motors have two phase windings which may be connected across respective phases of a two phase alternating current line and three phase motors have three phase windings which may be connected to respective phases of a three phase alternating current line. This relationship generally holds true through all alternating current induction motors of any number of phases. The number of coils per phase winding may vary depending upon the number of poles designed into the motor.

Motors of this type normally operate at constant, fixed speed which is determined by the frequency of the alternating current supply potential and the number of magnetic poles produced by the phase windings.

In certain applications where motors of this type may be advantageously used, it may be desirable to operate the motor at variable speeds. To change the speed of alternating current induction motors, it has heretofore been necessary to change the frequency of the alternating current supply potential or the number of magnetic poles produced by the phase windings. Both of these alternatives have been unsatisfactory in that the former requires expensive frequency converting equipment and the latter provides, at best, step by step control through compound switching arrangements.

As the use of induction motors is becoming increasingly popular, the requirement of a reliable and economical variable speed control system for motors of this type is apparent.

It is, therefore, an object of this invention to provide an improved speed control system for alternating current induction motors.

It is another object of this invention to provide an improved speed control system for alternating current induction motors wherein the conduction angle of the potential cycles of all of the phases is equal to the conduction angle of the potential cycles of one of the phases selected to be the reference phase.

The novel speed control system of this invention provides for the production of an electrical trigger signal at the phase angle during each potential cycle of the selected reference phase as determined by the selected motor speed and for subsequent electrical trigger signals spaced by an electrical angle equal to the electrical angle between phases of the alternating current supply potential during each subsequent phase for operating respective responsive switching devices which establish respective phase winding energizing circuits when operated to close by these signals.

Figure 2:
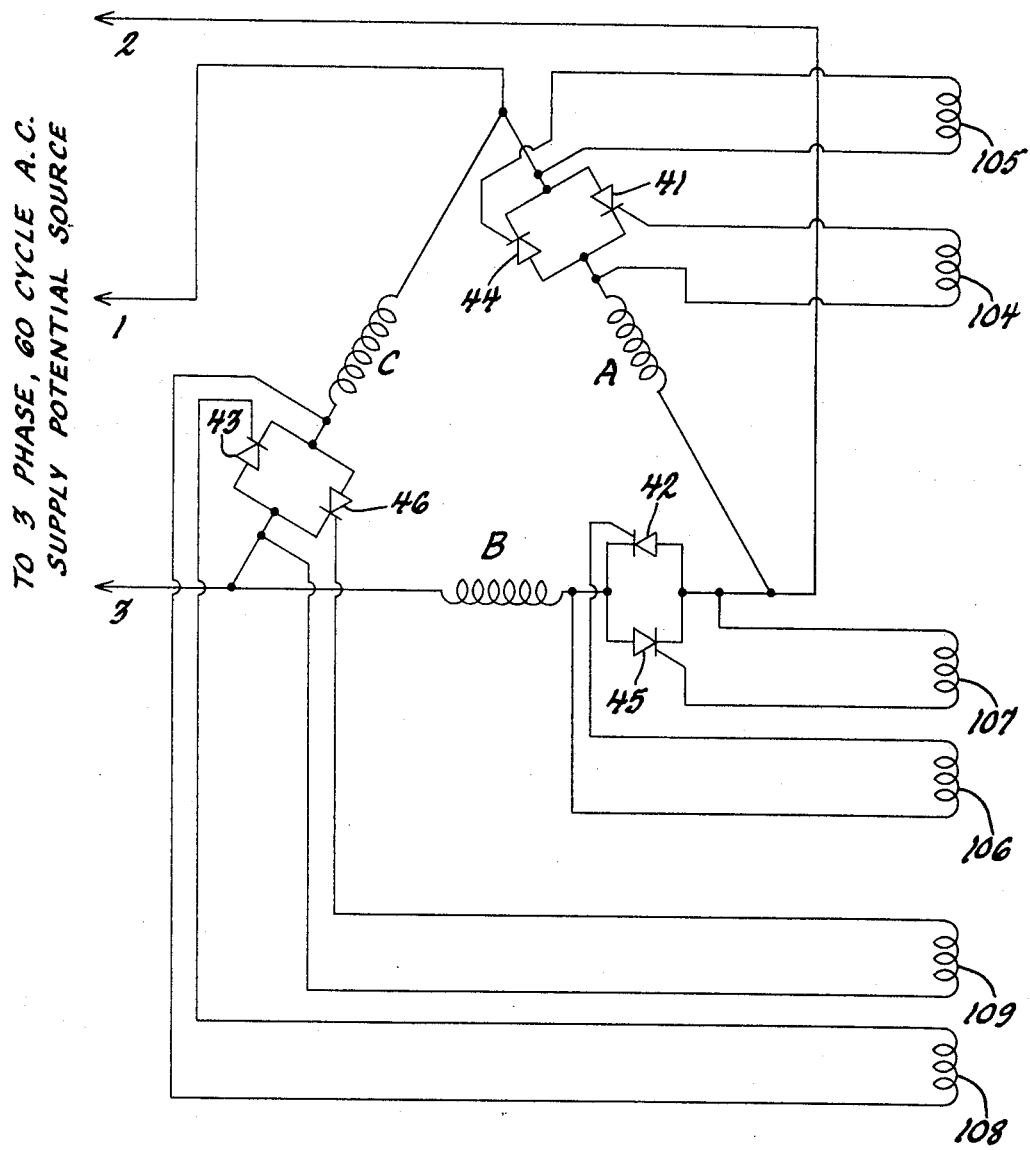

For a better understanding of the present invention, together with additional objects, advantages and features thereof, reference is made to the following description and accompanying drawings in which:

FIGURE 1 is a schematic diagram of one embodiment of the speed control system of this invention as used with a Y connected alternating current induction motor, FIGURE 2 is a schematic diagram of the switching system for a delta connected alternating current motor which may be used with the circuitry schematically set forth in FIGURE 1, FIGURES 3a through 3e are a set of vector diagrams useful in understanding the operation of the novel speed control system of this invention.

It has been found that the speed of alternating current induction motors may be smoothly adjusted over a wide range of controlling the electrical conduction angle during which each potential cycle of each phase of the alternating current supply potential energizes the corresponding phase windings. To reduce the speed, the respective phase windings are energized over a shorter electrical conduction angle of each potential cycle of the corresponding phase. For optimum operation at any speed, the conduction angle of the potential cycles of all phases should be equal to the conduction angle of the potential cycles of one of the phases selected to be the reference phase.

The novel speed control system of this invention may be used with any alternating current induction motor of the type having discrete phase windings corresponding to each phase of a compatible alternating current supply potential, in a manner which will be brought out in this specification.

For purposes of illustrating the novel features of this invention and without intention on inference of a limitation thereto, the following detailed description will be in regard to both Y and delta connected three phase alternating current induction motors.

Referring to FIGURE 1, the novel speed control system of this invention, as used with a Y-connected alternating current induction motor, is schematically set forth. It is to be specifically understood that the phase windings labeled A, B and C in FIGURE 1 are not to be construed as single coils but as all coils of each phase winding.

To synchronize the novel system of this invention with the alternating current supply potential, it is necessary that a reference potential to be produce in synchronism with one of the phases of the alternating current supply potential selected as the reference phase. One method of doing this is to rectify the selected phase of the alternating current supply potential. In FIGURE 1, one phase of the alternating current supply potential is rectified by a full-wave diode bridge rectifier circuit, generally shown at reference numeral 10. It is to be specifically understood that this rectifier circuit may be of any configuration well known in the art and that the selected phase may be half-wave rectified to produce the required reference potential. With single phase applications, the reference phase is, of course, the only phase of the supply potential.

As the frequency and amplitude of the alternating current supply potential and, therefore, the reference potential remains substantially constant, the variable parameter necessary to control motor speed is a control potential which not only is related to and varies in magnitude with motor speed, but which is also selectively variable in magnitude for varying the speed of the motor.

One method of producing a potential which varies with motor speed is an electric tachometer which is driven by the motor shaft and which produces a direct current output potential, the magnitude of which is proportional to motor speed. Commercially available tachometers of this type are small direct current generators which are designed to produce an output direct current potential which increases and decreases linearly with increases and decreases of motor speed. These devices are adapted to be mounted upon the end bell of the motor housing in such a manner that the armature thereof is rotated by the motor shaft. As electrical tachometers of this type are well known in the art and form no part of this invention, it has been schematically illustrated as a circle in FIGURE 1 and referenced by the numeral 11. The positive and negative potential output terminals of tachometer 11 are connected across a resistor 12 through a diode 13 and a potentiometer, generally shown at 14, and lead 15, respectively.

With this arrangement, the required control potential is applied across resistor 12. The movable contact of series connected potentiometer 14 may be changed to vary the magnitude of the control potential appearing across resistor 12. Therefore, the magnitude of the control potential may be selectively varied by adjusting the movable contact of potentiometer 14 for varying the speed of the motor, in a manner to be later explained in detail.

Electrical circuitry responsive to a difference in magnitude between the reference potential and the control potential for producing a trigger signal at the phase angle of each potential cycle of each phase of the alternating current supply potential, as determined by the magnitude of the difference, is provided. One example of circuitry of this type is a unijunction transistor type relaxation oscillator master trigger signal producing circuit comprising unijunction transistor 20, resistors 21 and 22 and capacitor 23 and two slave trigger signal producing circuits comprising transistors 25 and 26 and their associated circuitry and transistors 29 and 30 and their associated circuitry. The precise operation of this circuitry will be explained in detail later in this specification.

For three phase applications, this trigger signal producing circuitry may be as shown in FIGURE 1. With single and two phase applications, only the master circuit and the master and one slave circuit is required, respectively. With applications involving more than three phases, an additional slave circuit is required for each phase.

Corresponding to each phase of the alternating current supply potential is a controllable switching circuit device for completing an energizing circuit for the corresponding phase windings in response to respective trigger signals. In FIGURE 1, these switching circuit devices have been illustrated as silicon controlled rectifiers 31, 32 and 33 which interconnect the electrical neutral ends of phase windings A, B and C, as shown. In FIGURE 2, with shows the phase windings A, B and C of a three phase induction motor connected in a delta configuration, these controllable switching devices have been shown as the parallel combination of two oppositely poled silicon controlled rectifiers connected in series with the phase windings corresponding to each phase.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. Upon being triggered to conduction, however, the control electrode is no longer capable of affecting the device which will remain in the conducting state until either the anode-cathode circuit is interrupted or the polarity of the potentials applied across the anode-cathode electrodes are reversed.

Considering silicon controlled rectifiers 31, 32 and 33 of FIGURE 1 individually, silicon controlled rectifier 31 corresponds to phase A and, when conducting, completes an energizing circuit for the phase windings corresponding to phase A through the phase windings corresponding to phase B. Silicon controlled rectifier 32 corresponds to phase B and, when conducting, completes an energizing circuit for the phase winding corresponding to phase B through the phase winding corresponding to phase C. Silicon controlled rectifier 33 corresponds to phase C and, when conducting, completes an energizing circuit for the phase winding corresponding to phase C through the phase winding corresponding to phase A. With both silicon controlled rectifiers 31 and 32 conducting, phase A may feed both phases B and C; with both silicon controlled rectifiers 32 and 33 conducting, phase B may feed both phases C and A and with both silicon controlled rectifiers 33 and 31 conducting, phase C may feed both phases A and B.

In FIGURE 2, the parallel combination of oppositely poled silicon controlled rectifiers 41 and 44 correspond to phase A and are connected in series with the phase winding corresponding to phase A. The parallel combination of oppositely poled silicon controlled rectifiers 43 and 46 correspond to phase B and are connected in series with the phase winding corresponding to phase B. The parallel combination of oppositely poled silicon controlled rectifiers 42 and 45 correspond to phase C and are connected in series with the phase winding corresponding to phase C.

With single and two phase applications, one and two switching devices, respectively, are required. With applications of more than three phases, one or two switching devices corresponding to each phase may be required depending upon the configuration in which the phase windings are connected.

Referring to FIGURE 1, one phase, as selected, of the three phase alternating current supply potential is connected to the alternating current terminals of full wave bridge rectifier 10 through leads 34 and 35. The respective positive and negative polarity terminals of bridge rectifier 10 are connected to the cathode and anode electrodes, respectively, of a conventional Zener diode 36.

The Zener diode is a semiconductor device having two current carrying electrodes, generally referred to as the anode and cathode electrodes, which is designed to function as a conventional diode and conduct current in the forward direction when forward poled, anode positive and cathode negative, and to conduct current in the reverse direction when reverse poled, anode negative and cathode positive, when the applied potential exceeds the rated inverse breakdown potential of the device. When conducting in the reverse direction, the potential drop across a Zener diode remains substantially constant with changes in magnitude of current flow.

As the anode electrode of Zener diode 36 is connected to the positive polarity output terminal of bridge rectifier 10 and the anode electrode is connected to the negative polarity output terminal of bridge rectifier 10, Zener diode 36 is reverse poled. Therefore, the rectified reference potential appearing across the direct current output terminals of bridge rectifier 10 is clipped by Zener diode 36 and does not exceed a magnitude which is substantially equal to and determined by the rated inverse breakdown potential of the Zener diode selected for this application.

The master trigger signal producing circuit is shown to be a unijunction transistor type relaxation oscillator circuit comprising unijunction transistor 20, base resistors 21 and 22 and the series combination of resistor 12 and capacitor 23. Base resistors 21 and 22 are connected across Zener diode 36 and the series combination of resistor 12 and capacitor 23 is also connected across Zener diode 36 through the parallel combination of resistor 37, series connected resistor 38 and diode 39 and capacitor 40 and point of reference potential 5.

Zener diode 36 serves to stabilize the reference potential and also provides a suitable bias potential for unijunction transistor 20. Therefore, Zener diode 36 should be selected to have an inverse breakdown potential rating of a magnitude compatible with the bias requirements for the unijunction transistor device selected for this application.

The control potential produced by tachometer 11 is applied across resistor 12, as shown.

As has been previously brought out, for three phase applications, two slave trigger signal producing circuits are required. With these slave trigger signal producing circuits connected in cascade with the master trigger signal producing circuit and responsive to the trigger signal produced by the next preceding trigger signal producing circuit, a trigger signal corresponding to each phase of the alternating current supply potential is provided.

Each one of the slave trigger signal producing circuits may be a conventional monostable multivibrator circuit and are comprised of respective transistor pairs 25 and 26 and 29 and 30 and the included associated circuitry. The collector electrodes of transistors 25, 26, 29 and 30 are connected through respective resistors 51, 52, 53 and 54 to terminal 55, which is connected to a conventional direct current potential source, not shown. The potential present upon terminal 55 is of a positive polarity in respect to point of reference potential 5 and of a magnitude compatible with the rated potential of type NPN transistors 25, 26, 29 and 30. The emitter electrodes of these four transistors are connected to point of reference potential 5. Therefore, the emitter-collector electrode circuits of these four type NPN transistors are forward poled. The collector electrodes of transistors 25 and 29 are also connected to positive polarity potential terminal 55 through the series combination of capacitor 56, fixed resistor 57 and potentiometer 58 and through the series combination of capacitor 66, fixed resistor 67 and potentiometer 68, respectively. The base electrodes of transistors 26 and 30 are connected to the junction between capacitor 56 and resistor 57 and the junction between capacitor 66 and resistor 67, respectively. The base electrodes of transistors 25 and 29 are connected to the collector electrodes of transistors 26 and 30, respectively, through respective resistors 59 and 60 and to terminal 61, which is connected to a conventional direct current potential source, not shown, through respective resistors 62 and 63. The potential upon terminal 61 is of a negative polarity in respect to point of reference potential 5 and of a magnitude compatible with the rated reverse break-down potential of the base-emitter junctions of transistors 25 and 29.

Monostable multivibrator devices are two stage electronic circuits and are characterized by a stable state of operation and an alternate state of operation. These devices may be triggered to the alternate state by a trigger signal and they will remain in the alternate state of operation for a period of time as determined by the circuit parameters. At the conclusion of the period of time as designed into the circuitry, these devices spontaneously return to the original or stable state of operation.

As the monostable multivibrator circuits of FIGURE 1 comprising transistor pairs 25 and 26 and 29 and 30 are identical in operation, only the operation of transistor pair 25 and 26 and the associated circuitry will be described in detail. As the base electrode of transistor 26 is connected to the junction between capacitor 56 and fixed resistor 57, and the emitter electrode is connected to point of reference potential 5, the potential present upon the base of transistor 26 is positive in respect to the potential present upon the emitter, a condition which satisfies the base-emitter bias requirements to permit base-emitter current flow through a type NPN transistor, therefore, transistor 26 is normally conducting.

With transistor 26 conducting and saturated, the potential at junction 69 is substantially ground potential. As the base of transistor 25 is connected to the junction between resistors 62 and 59 which form a voltage divider network between negative polarity terminal 61 and junction 69, which is substantially ground potential, potential applied to the base electrode of transistor 25 is of a polarity more negative than that present upon the emitter electrode, a condition which does not satisfy the base-emitter bias requirements for base-emitter current flow through a type NPN transistor, therefore, transistor 25 is normally not conducting. Upon the application of a positive polarity trigger signal to the base electrode of transistor 25 through a conventional diode 70, the base-emitter bias requirements for the conduction of base-emitter current flow through a type NPN transistor is satisfied and transistor 25 may be thereby triggered to conduction. As transistor 25 conducts, capacitor 56 initially appears as a short circuit and the potential at the junction between capacitor 56 and resistor 57, which is applied to the base electrode of transistor 26, goes to substantially negative supply potential. As this potential upon the base electrode of transistor 26 does not satisfy the base-emitter bias requirements for conduction through a type NPN transistor, transistor 26 is turned off and the monostable multivibrator device is now in its alternate state. With transistor 25 conducting, capacitor 56 begins to charge through a circuit which may be traced from positive polarity terminal 55 through potentiometer 58, resistor 57 and conducting transistor 25 to point of reference potential 5. After capacitor 56 has become charged to the forward breakdown potential of the base-emitter junction of transistor 26, the potential applied to the base electrode of transistor 26 is of a positive polarity, a condition which satisfies the base-emitter bias requirements for conduction through a type NPN transistor, therefore transistor 26 begins to conduct and the monostable multivibrator device has returned to its original or stable state. From this description, it is apparent that the period of time during which a monostable multivibrator device remains in the alternate state is determined by primarily the time constant of the circuit including capacitor 56, resistor 57 and potentiometer 58 as determined by the setting of the movable contact of poteniometer 58. Therefore, the period of time during which the monostable multivibrator device will remain in its alternate state may be selected by adjusting the movable contact of potentiometer 58.

The unijunction transistor is a semiconductor device having two base electrodes and an emitter electrode which is characterized by a high emitter to base resistance with an applied emitter potential of a magnitude less than the peak point voltage. With an applied emitter potential of a magnitude equal to or greater than the peak point voltage, the unijunction transistor switches to a low resistance state. The magnitude of the peak point voltage required to switch a unijunction transistor to the low resistance state is determined by the intrinsic standoff ratio of the device. While the value of the intrinsic standoff ratio varies with different unijunction transistor types, it generally falls within the range of .50 to .75. The peak point voltage is substantially the product of the interbase potential multiplied by the intrinsic standoff ratio of the unijunction transistor being used. Therefore, the peak point voltage may vary between ½ and ¾ of the interbase potential, depending upon the characteristics of the device. After being triggered to conduction, the unijunction transistor spontaneously extinguishes itself when the potential applied to the emitter electrode is reduced to a specific magnitude less than the peak point voltage.

Disregarding the control potential applied across resistor 12, in the relaxation oscillator circuit of FIGURE 1 which has been previously described, capacitor 23 is charged by the reference potential appearing across Zener diode 36 through series resistor 12. When the charge upon capacitor 23, which is applied to the emitter electrode 19 of unijunction transistor 20, reaches a magnitude substantially equal to the peak point potential of unijunction transistor 20, this device switches to the low resistance or conducting state. With unijunction transistor 20 in the low resistance or conducting state, capacitor 23 discharges through resistor 22 through the emitter-base junction of unijunction transistor 20. When the potential applied to emitter electrode 19 decreases to a value which is of insufficient magnitude to maintain unijunction transistor 20 conducting as capacitor 23 discharges, the unijunction transistor 20 reverts to its high resistance or non-conducting state and the cycle just described is repeated.

When capacitor 23 discharges through resistor 22, a signal potential is produced across resistor 22 which is of a positive polarity at the unijunction transistor end thereof. As only one trigger signal is required during each potential cycle of each phase and since the relaxation oscillator circuit is normally free running as described in the preceding paragraph, it is necessary that the relaxation oscillator circuit be disenabled after a trigger signal has been produced during the remainder of each potential cycle. To disenable the relaxation oscillator circuit of FIGURE 1 upon the production of a trigger signal and for the remainder of the potential cycle, a silicon controlled rectifier 50 is provided.

In FIGURE 1, the anode electrode and cathode electrode of silicon controlled rectifier 50 are connected to the positive and negative polarity output terminals, respectively, or bridge rectifier 10 through a current limiting resistor 64, therefore, silicon controlled rectifier 50 is forward poled. The appearance of the positive polarity trigger signal at the unijunction transistor end of resistor 22 triggers this device to conduction, a condition which removes the interbase potential from unijunction transistor 20 as conducting silicon controlled rectifier 50 is substantially a short circuit across the direct current terminals of bridge rectifier 10, resistor 64 and Zener diode 36. Therefore, with silicon controlled rectifier 50 conducting, the relaxation oscillator of FIGURE 1 is disenabled. Silicon controlled rectifier device 50 remain conducting during the remainder of the half cycle of the alternating current supply potential and is extinguished when the rectified potential across the direct current terminals of bridge rectifier 10 falls to zero as the potential cycle of the alternating current supply potential passes from its positive to negative polarity excursion.

As has been previously brought out, one method of varying the speed of an alternating current induction motor is to vary the electrical conduction angle of each potential cycle of each phase of the alternating current supply potential during which the corresponding phase windings are energized, the greater the electrical conduction angle, the greater the speed and/or load of the motor. In the circuit of FIGURE 1, the trigger signals thereby produced are referred to a selected phase of the alternating current supply potential and operate responsive switching devices to complete an energizing circuit for the phase windings corresponding to the phase of the alternating current supply potential during which the signals are produced. Therefore, to vary the speed of the motor, the trigger signals must be produced at the phase angle of each potential cycle of each phase of the alternating current supply potential which will results in a conduction angle over the remainder of each potential cycle which will produce the selected speed. As the trigger signals produced by the slave trigger signal producing circuits are referred to the trigger signals produced by the master trigger signal producing circuit, this circuit will be initially considered.

Capacitor 23 begins to charge with the appearance of the reference potential, which is synchronized with a selected phase of hte alternating current supply potential, across Zener diode 36 and unijunction transistor 20 is triggered to conduction to produce a trigger signal when the charge on capacitor 23 has reached a magnitude substantially equal to the peak point potential of unijunction transistor 20. To change the conduction angle, therefore, the time required for the charge on capacitor 23 to reach a magnitude substantially equal to the peak point potential of unijunction transistor 20 may be varied.

In capacitor charging circuits, the capacitor will charge substantially exponentially to substantially full potential in a period of time which is substantially equal to four times the time constant of the circuit regardless of the magnitude of the potential to which it is charged. Therefore, the initial substantially linear rate of charge is determined, to a great extent, by the magnitude of the potential charge, the greater the magnitude of the charge, the greater the initial rate.

According to Kirchhoff's second law, the sum of the potential drops in any complete or closed circuit must equal the sum of the potential rises in that circuit. In applying this law, in tracing through any single circuit, whether it is by itself or a part of a network, a potential drop exists when tracing through a resistance with or in the same direction as the current, or through a battery or generator against their potential, from positive to negative, and a voltage rise exists when tracing through a resistance against, or in a directon opposite to the current, or through a battery or a generator in a direction with their potential, negative to positive.

Considering Zener diode 36 as a potential generator and disregarding the control potential, the sum of the potential drops across the parallel combination of capacitor 40, resistor 38 and diode 39 in series and resistor 37, across resistor 12, across capacitor 23 and across the resistance of the interconnecting wires must equal the potential rise across Zener diode 36. With a potential applied across resistor 12 and poled as shown, this resistor may be considered a potential generator, and tracing through the same loop in the same direction and with the potential applied across resistor 12 poled as shown in FIGURE 1, the potential appearing across resistor 12 is a potential drop for purposes of Kirchhoff's second law. As the reference potential across Zener diode 36 and the values of the components remain substantially constant, the increase in magnitude of the potential drop across resistor 12 as introduced by the control potential applied thereacross must be accompanied by a corresponding decrease in potential drop across capacitor 23 to satisfy Kirchhoff's second law. As the potential drop across capacitor 23 determines the magnitude of the charge thereon, the initial rate of charge of capacitor 23 and, therefore the time required for the charge to increase in magnitude to the peak point potential of unijunction transistor 20 may be varied by varying the magnitude of the control potential applied across resistor 12.

The control potential produced by tachometer 11, which is related to and varies in a magnitude with motor speed and is also selectively variable by adjusting the movable contact of potentiometer 14, is the variable circuit parameter which may be employed for altering the maximum potential to which capacitor 23 may be charged and is, therefore, connected across resistor 12 for the purpose of controlling motor speed.

For any constant motor speed, the magnitude of the control potential and, therefore, the maximum potential to which capacitor 23 may be charged remains constant and a trigger signal is produced across resistor 22 at the same phase angle of each potential cycle of the phase of the alternating current supply potential selected as a reference.

Should the movable contact of potentiometer 14 be adjusted in the direction to increase the series resistance of potentiometer 14, the control potential magnitude impressed across resistor 12 decreases in that the control potential produced by tachometer 11 is constant at any constant motor speed. This reduction in magnitude of control potential across resistor 12 results in an increase in magnitude of the potential drop across capacitor 23 by an amount equal to the difference between the magnitude of the reference potential and the reduced magnitude of control potential. The increased potential drop across capacitor 23 also increases the magnitude of the ultimate charge thereacross, a condition which substantially increases the initial substantially linear rate of charge of capacitor 23. With this increased initial charge rate, the charge of capacitor 23 reaches a magnitude substantially equal to the peak point potential of unijunction transistor 20 earlier during each cycle of the reference phase of the alternating current supply potential, thereby increasing the motor speed because of the increased conduction angle.

Should the movable contact of potentiometer 14 be adjusted in the direction to reduce the series resistance of potentiometer 14, the control potential magnitude impressed across resistor 12 increases. This increase in magnitude of control potential across resistor 12 results in a reduction in magnitude of the potential drop across capacitor 23 by an amount equal to the difference between the magnitude of the reference potential and the increased magnitude of control potential. The reduced potential drop across capacitor 23 also reduces the magnitude of the ultimate charge thereacross, a condition which substantially reduces the initial substantially linear rate of charge of capacitor 23. With this reduced initial charge rate, the charge upon capacitor 23 reaches a magnitude substantially equal to the peak point potential of unijunction transistor 20 later during each cycle of the reference phase of the alternating current supply potential, thereby reducing the motor speed because of the reduced conduction angle.

From this description, it is apparent that the speed of the motor may be selectively varied by adjusting potentiometer 14 which varies the magnitude of control potential applied across resistor 12.

To increase the initial charge rate of capacitor 23 substantially, capacitors 40 and 16 are included in the charging circuit. Since these elements appear as short circuits at the beginning of each charge period, the time constant of the charging circuit is very short, therefore, capacitor 23 initially charges very rapidly. This is important particularly at the higher selected speeds and for heavier loads when the trigger signals must be produced early during or at the beginning of each cycle. After capacitors 40 and 16 have become charged, the parallel combination of series connected resistor 38 and diode 39 and resistor 37 become factors in the capacitor 23 charging circuit and substantially reduce the rate of charge, a condition which is important particularly at the lower speeds when the trigger signals must be produced later during each cycle.

Assuming that the motor is operating at a selected speed as determined by the adjustment of potentiometer 14, the control potential remains substantially constant and the trigger signals are produced at the phase angle of each potential cycle of each phase which will produce this speed. Any tendency of the motor to reduce speed for any reason would be accompanied by a proportional decrease in the magnitude of the control potential. This reduction in control potential magnitude is reflected as an increase in magnitude of the potential drop across the capacitor 23 and the magnitude of the ultimate charge thereacross, a condition which increases the initial substantially linear rate of charge of capacitor 23. With this increased initial charge rate, the charge on capacitor 23 reaches a magnitude substantially equal to the peak point potential of unijunction transistor 20 earlier during each cycle of the reference phase of the alternating current supply potential, thereby tending to increase or restore motor speed.

Similarly, any tendency of the motor to increase speed for any reason would be accompanied by a proportional increase in magnitude of control potential. This increase in control potential is reflcted as a decrease in magnitude of potential drop across capacitor 23 and the magnitude of the ultimate charge thereacross, a condition which reduces the initial charge rate of capacitor 23. With this reduction of initial charge rate, the charge upon capacitor 23 reaches a magnitude substantially equal to the peak point potential of unijunction transistor 20 later during each potential cycle of the reference phase of the alternating current supply potential, thereby tending to reduce or restore motor speed.

From this description, it is apparent that the novel speed control system of this invention not only varies the speed of an alternating current induction motor but also maintains the selected speed under variable load conditions.

As the charge available for capacitor 23 of the unijunction transistor type relaxation oscillator of FIGURE 1 is substantially equal to the difference between the reference potential magnitude and the control potential magnitude, this circuit is responsive to a difference between the magnitude of the reference potential and the control potential for producing a trigger signal across resistor 22 at the phase angle of each potential cycle of the reference phase of the alternating current supply potential as determined by the difference.

With single phase operation, only the master trigger signal producing circuit is required to control the conduction angle over which the phase windings are energized by the alternating current potential source.

For optimum operation at any speed and to provide precise speed control under no load or light load conditions with polyphase supply potential applications, it is necessary that the conduction angle of the potential cycles of all phases be equal to the conduction angle of the potential cycles of the phase selected as the reference. With polyphase applications, therefore, it is necessary to provide trigger signal producing circuitry which will produce successive trigger signals each corresponding to a respective phase of the alternating current supply potential and spaced from each other by an electrical angle equal to the electrical angle between phases of the alternating current supply potential.

With three phase applications, for example, the trigger signal produced by the master trigger signal producing circuit and the trigger signal produced by the first slave trigger signal producing circuit comprising the monostable multivibrator including transistor pair 25 and 26 previously described must be spaced by 120 electrical degrees and the trigger signal produced by the second slave trigger signal producing circuit comprising the monostable multivibrator device including transistor pair 29 and 30 previously described must be separated from the trigger signal produced by the first slave trigger signal producing circuit by 120 electrical degrees.

The signal produced across resistor 22 by the master trigger signal producing circuitry may be amplified by a conventional transistor amplifier circuit comprising type NPN transistor 75 in FIGURE 1. The collector electrode of transistor 75 is connected to positive polarity terminal 55 through current limiting resistor 79 and the primary winding of a conventional pulse transformer, generally shown at 76, and the emitter electrode thereof is connected to point of reference potential 5. Therefore, transistor 75 is forward poled and, as the base electrode thereof is returned to point of reference potential 5 through resistors 83 and 22, it is normally not conducting. Upon the appearance of a positive polarity signal across resistor 22, however, the potential upon the base electrode of transistor 75 is of a positive polarity in respect to the emitter electrode, a condition which satisfies the base-emitter bias requirements for base-emitter current flow through a type NPN transistor, therefore, transistor 75 is biased to conduction by the signal produced across resistor 22. During the period of conduction of transistor 75, a pulse of current, which increases from zero to a value as determined by circuit impedance, flows from positive polarity terimnal 55 through the primary winding of pulse transformer 76, current limiting resistor 79 and the collector-emitter electrodes of transistor 75 to point of reference potential 5. The leading edge, or increase from zero, of this current pulse is employed as the trigger signal in this portion of the trigger signal producing circuitry.

As current begins to flow through the primary winding of pulse transformer 76 with each of these trigger signals, the resulting increasing magnetic field induces a potential in each of secondary windings 77 and 78, magnetically coupled thereto. The potentials induced in secondary winding 78 are applied across the control-cathode electrodes of silicon controlled rectifier switch 31 through leads 80 and 81, respectively, and the potentials induced in secondary winding 77 are applied across the base-emitter electrodes of transistor 25 through lead 82 and diode 70 and point of reference potential 5, respectively. Secondary winding 78 is so poled that the end connected to lead 80 is of a positive polarity with an increase of current flow through the primary winding of pulse transformer 76, therefore, silicon controlled rectifier 31 will be triggered to conduction by this trigger signal with a proper polarity potential appearing across phase windings A and B. Secondary winding 77 is so poled that the end connected to lead 82 is of a positive polarity potential with an increase in current flow through the primary winding of pulse transformer 76, therefore, transistor 25 is triggered to conduction by this trigger signal.

As transistor 25 is triggered to conduction, transistor 26 is triggered to nonconduction, in a manner previously described, and this monostable multivibrator circuit is in the alternate state of operation. As transistor 26 goes nonconductive, a signal appears across resistor 52 which is of a positive polarity at junction 69.

The signal produced across resistor 52 may be amplified by a conventional transistor amplifier circuit including type NPN transistor 85, the collector-emitter electrodes of which are connected across positive polarity terminal 55 and point of reference potential 5 and, therefore, are forward poled.

The positive polarity potential appearing at junction 69 and applied to the base electrode of transistor 85 is of the proper polarity to produce base-emitter current flow through a type NPN transistor, therefore, transistor 85 is triggered to conduction.

After a time duration as determined by the values of the circuit components in the timing circuit of the monostable multivibrator including transistors 25 and 29, previously described, transistor 25 spontaneously returns to the nonconductive state and transistor 26 goes conductive, removing the potential from junction 69 and extinguishing transistor 85.

During the period of conduction of transistor 85, a pulse of current, which increases from zero to a value as determined by circuit impedance, flows from positive potential terminal 55, through the primary winding of pulse transformer 86, current limiting resistor 89 and the collector-emitter electrodes of transistor 85 to point of reference potential 5 and returns to zero as transistor 85 is extinguished. The trailing edge of this current pulse as it returns to zero is employed as the trigger signals in this portion of the trigger signal producing circuitry.

As current ceases to flow through the primary winding of transformer 86 with each of these trigger signals, the resulting collapsing magnetic field induces a potential in each of the magnetically coupled secondary windings 87 and 88. Secondary winding 87 is so poled that the potential induced therein by the collapsing magnetic field is of a positive polarity at the end connected to lead 92 and secondary winding 88 is so poled that the potential induced therein by the collapsing magnetic field is of a positive polarity at the end connected to lead 90.

The potentials induced in secondary winding 87 are applied across the base-emitter electrodes of transistor 29 through lead 92 and diode 71 and point of reference potential 5, respectively. As the potential induced in secondary winding 87 by the collapsing magnetic field of the primary winding is of a positive polarity at the end connected to lead 92, the proper potential polarity relationship is established across the base-emitter electrodes of transistor 29 to produce base-emitter current flow through a type NPN transistor, therefore, this device is triggered to conduction by this trigger signal. The potentials induced in secondary winding 88 are applied across the control-cathode electrodes of silicon controlled rectifier 32 through leads 90 and 91, respectively. As the potential induced in secondary winding 88 by the collapsing magnetic field of the primary winding is of a positive polarity at the end connected to lead 90, the proper potential polarity relationship is established across the control-cathode electrodes of silicon controlled rectifier 32 to produce gate current through a silicon controlled rectifier, therefore, this device will be triggered to conduction by this trigger signal with a proper polarity potential appearing across phase windings B and C.

As transistor 29 is triggered to conduction, transistor 30 is triggered to nonconduction, in a manner previously described, and this monostable multivibrator circuit is in the alternate state of operation. As transistor 30 goes nonconductive, a signal appears across resistor 54 which is of a positive polarity at junction 72.

The signal produced across resistor 54 may be amplified by a conventional transistor amplifier circuit including type NPN transistor 95, the collector-emitter electrodes of which are connected across positive polarity terminal 55 and point of reference potential 5 and, therefore, are forward poled.

The positive polarity potential appearing at junction 72 and applied to the base electrode of transistor 95 is of the proper polarity to produce base-emitter current flow through a type NPN transistor, therefore, this device is triggered to conduction.

After a time duration as determined by the values of the circuit components in the timing circuit of the monostable multivibrator including transistors 29 and 30, previously described, transistor 30 spontaneously returns to the nonconductive state and transistor 26 goes conductive, removing the potential from junction 72 and extinguishing transistor 95.

During the period of conduction of transistor 95, a pulse of current, which increases from zero to a value as determined by circuit impedance, flows from positive potential terminal 55, through the primary winding of pulse transformer 96, current limiting resistor 98 and the collector-emitter electrodes of transistor 95 to point of reference potential 5 and returns to zero as transistor 95 is extinguished. The trailing edge of this current pulse as it returns to zero is employed as the trigger signal in this portion of the trigger signal producing circuitry.

As current ceases to flow through the primary winding of transformer 96 with each of these trigger signals, the resulting collapsing magnetic field induces a potential in magnetically coupled secondary winding 97. Secondary winding 97 is so poled that the potential induced therein by the collapsing magnetic field of the primary winding at the end connected to lead 100.

The potentials induced in secondary winding 97 are applied across the control-cathode electrodes of silicon controlled rectifier 33 through leads 100 and 101, respectively. As the potential induced in secondary winding 97 by the collapsing magnetic field of the prmiary winding is of a positive polarity at the end connected to lead 100, the proper potential polarity relationship is established across the control-cathode electrodes of silicon controlled rectifier 33 to produce gate current flow through a silicon controlled rectifier, therefore, this device will be triggered to conduction by this trigger signal with proper polarity potential appearing across phase windings A and C.

The potentials induced in secondary windings 77 and 78 by the collapsing magnetic field of the primary winding of transformer 76, in secondary windings 87 and 88 and in secondary winding 97 with the increasing magnetic field of respective transformers 86 and 96 are of the incorrect polarity and therefore, are rejected by and do not affect the operation of this circuit.

Briefly reviewing the operation of the trigger signal producing circuitry just described, the trigger signal produced by the master signal producing circuit is applied across the gate-cathode electrodes of silicon controlled rectifier 31 and triggers the monostable multivibrator circuit including transistors 25 and 26 to the alternate state. The trigger signal produced by this monostable multivibrator circuit as it returns to the stable state of operation is applied to the gate-cathode electrodes of silicon controlled controlled rectifier 32 and triggers the monostable multivibrator circuit including transistors 29 and 30 to the alternate state. The trigger signal produced by this monostable multivibrator circuit as it returns to the stable state of operation is applied across the gate-cathode electrodes of silicon controlled rectifier 33.

The period of time between the trigger signals produced by the master trigger producing circuitry and the first slave trigger signal producing circuitry and between the trigger signals produced by the first slave trigger producing circuit and the second slave trigger signal producing circuit may be selected to correspond to the electrical angle which is equal to the electrical angle between phases of the alternating current supply potential by adjusitng respective potentiometers 58 and 68 of the timing circuit in the respective monostable multivibrator circuits. For example, with three phase, sixty cycle applications, the time duration between these trigger signals should be 5.5 microseconds, a period of time which corresponds to one hundred twenty electrical degrees at sixty cycles per second.

It is to be specifically understood that this invention is not to be limited to the precise trigger signal producing circuitry as hereinabove described as alternate methods for producing these spaced trigger signals may be employed without departing from the spirit of the invention. For example, the multivibrator circuits of both the first and second slave trigger producing circuits may be triggered to the alternate state by the trigger signal produced by the master trigger signal producing circuit. With this alternative, potentiometer 58 may be adjusted to produce a time duration which corresponds to the electrical angle between phases of the alternating current supply potential and potentiometer 68 may be adjusted to produce a time duration corresponding to twice the electrical angle between phases of the alternating current supply potential.

For purposes of describing the operation of the novel speed control circuit of this invention, it will be assumed that a source of three phase, sixty cycle alternating current supply potential is energizing phase windings A, B and C, connected in a Y configuration as shown in FIGURE 1, and that the movable contact of potentiometer 14 is adjusted to a position whereat the master trigger signal producing circuitry produces a trigger signal at a phase angle of 10° of phase A, the selected reference phase. The potential of each of the three phases of the alternating current supply potential is of a magnitude as represented by the vector diagram of FIGURE 3a wherein the vectors labeled X, Y and Z correspond to respective phases A, B and C. The trigger signal produced by the master trigger signal producing circuit corresponds to phase A and is applied across the control-cathode electrodes of silicon controlled rectifier 31 through respective leads 80 and 81.

The potential of phase A is increasing toward maximum positive from zero, the potential of phase B is approaching maximum negative and the potential of phase C is decreasing toward zero from maximum positive. As the potential of phase A is positive in respect to the potential of phase B, the anode-cathode electrodes of silicon controlled rectifier 31 are forward poled and, therefore, this device conducts, completing an energizing circuit for phase winding A through phase winding B.

120 electrical degrees later at 130 electrical degrees, the potential of each of phases A, B and C is represented by the vectors labeled Z, X and Y, respectively, of FIGURE 3a and a trigger signal corresponding to phase B is produced by the slave trigger signal producing circuitry comprising transistor pair 25 and 26 and their associated circuitry. This trigger signal is applied across the control-cathode electrodes of silicon controlled rectifier 32 through respective leads 90 and 91. The potential of phase B is increasing towards maximum positive from zero, the potential of phase C is approaching maximum negative and the potential of phase A is decreasing toward zero from maximum positive. As the potential of phase B is positive in respect to the potential of phase C, the anode-cathode electrodes of silicon controlled rectifier 32 are forward poled and, therefore, this device conducts. As the potential of phase A is positive in respect to the potential of phase B, silicon controlled rectifier 31 remains conductive. With silicon controlled rectifiers 31 and 32 conducting, an energizing circuit is completed for phase winding A through conducting silicon controlled rectifiers 31 and 32 and phase winding C and for phase winding B through conducting silicon controlled rectifier 32 and phase winding C, therefore, the motor begins to rotate.

Figure 3A:
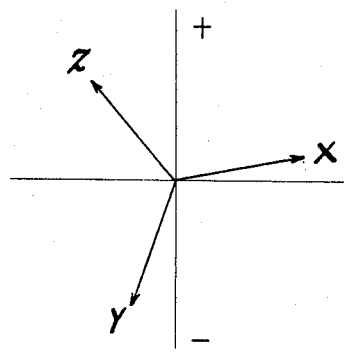
Figure 3B:
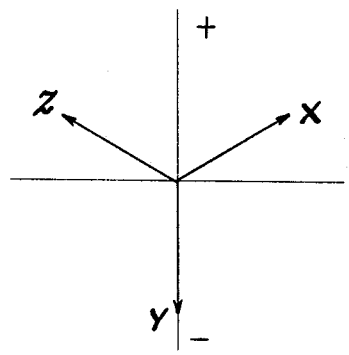

At 150 electrical degrees, the potential of each of phases A, B and C is represented by the vectors labeled Z, X and Y, respectively, of FIGURE 3b. The potentials of both phases A and B are positive and substantially equal in magnitude and the potential of phase C is maximum negative. As the potential of both phases A and B are positive in respect to the potential of phase C, the anode-cathode electrodes of silicon controlled rectifiers 31 and 32 are both forward poled, therefore, these devices remain conductive.

Figure 3C:
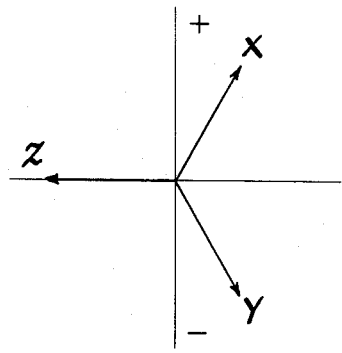

At 180 electrical degrees, the potential of each of phases A, B and C is represented by the vectors labeled Z, X and Y, respectively, of FIGURE 3c. The potential of phase A is zero, the potential of phase B is approaching maximum positive and the potential of phase C is increasing toward zero from maximum negative. As the potentials of both phases A and B are positive in respect to the potential of phase C, the anode-cathode electrodes of both silicon controlled rectifiers 31 and 32 are forward poled, therefore, these devices remain conductive.

Figure 3D:
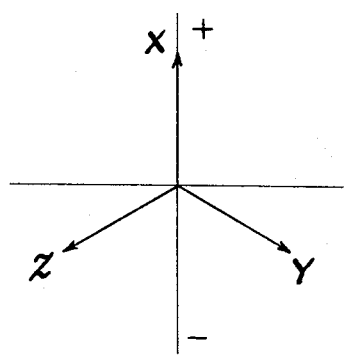

At 210 electrical degrees, the potential of each of phases A, B and C is represented by the vectors labeled Z, X and Y, respectively, of FIGURE 3d. The potential of both phases A and C is negative and substantially equal in magnitude and negative, the potential of phase B is maximum positive. As the potential of phase B is positive in respect to the potential of phase C, the anode-cathode electrodes of silicon controlled rectifier 32 are forward poled and, therefore, this device remains conductive. As the potential of both phases A and C is negative and substantially equal in magnitude, there is no longer a forward potential to maintain holding current through silicon controlled rectifier 31, therefore, this device becomes nonconductive.

120 electrical degrees after 130 electrical degrees at 250 electrical degrees, the potential of each of phases A, B and C is represented by the vectors labeled Y, Z and X, respectively, of FIGURE 3a and a trigger signal corresponding to phase C is produced by the slave trigger signal producing circuitry comprising transistor pair 29 and 30 and their associated circuitry. This trigger signal is applied across the control-cathode electrodes of silicon controlled rectifier 33 through respective leads 100 and 101. The potential of phase A is approaching maximum negative, the potential of phase B is decreasing toward zero from a maximum positive and the potential of phase C is rising toward maximum positive. As the potential of phase C is of a positive polarity in respect to the potential of phase A, the anode-cathode electrodes of silicon controlled rectifier 33 are forward poled and, therefore, this device conducts. As the potential of phase B is positive in respect to the potential of phase C, silicon controlled rectifier 32 remains conductive. With silicon controlled rectifier devices 32 and 33 conducting, an energizing circuit is completed for phase winding B through conducting silicon controlled rectifiers 32 and 33 and phase winding A and for phase winding C through conducting silicon controlled rectifier 33 and phase winding A.

At 270 electrical degrees, the potential of each of phases A, B, and C is represented by the vectors labeled Y, Z and X, respectively, of FIGURE 3b. The potential of phase A is maximum negative, and the potentials of phases B and C are positive and substantially equal in magnitude. As the potential of both phases B and C is positive in respect to the potential of phase A, the anode-cathode electrodes of silicon controlled rectifiers 32 and 33 are forward poled and, therefore, these devices remain conducting.

At 300 electrical degrees, the potential of each of phases A, B and C is represented by the vectors labeled Y, Z and X, respectively, of FIGURE 3c. The potential of phase A is approaching zero from maximum negative, the potential of phase B is zero and the potential of phase C is approaching maximum positive. As the potentials of both phases B and C are positive in respect to the potential of phase A, the anode-cathode electrodes of silicon controlled rectifiers 32 and 33 are forward poled and, therefore, these devices remain conducting.

At 330 electrical degrees, the potential of each of phases A, B and C is represented by the vectors labeled Y, Z and X, respectively, of FIGURE 3d. The potentials of both phases A and B are negative and substantially equal in magnitude and the potential of phase C is maximum positive. As the potential of phase C is positive in respect to the potential of phase A, the anode-cathode electrodes of silicon controlled rectifier 33 are forward poled and, therefore, this device remains conductive. As the potentials of both phases A and B are negative and substantially equal in magnitude, there is no longer a forward potential to maintain holding current through silicon controlled rectifier 32, therefore, this device becomes nonconductive.

120 electrical degrees after 250 electrical degrees at 10 electrical degrees of the next cycle, the next trigger signal corresponding to phase A is produced by the master trigger signal producing circuitry and is applied across the control-cathode electrodes of silicon controlled rectifier 31 through respective leads 81 and 82 to trigger this device to conduction.

At 90 electrical degrees of the next cycle, the potential of each of phases A, B and C is represented by the vectors labeled X, Y and Z of FIGURE 3d. The potential of phase A is maximum positive and the potentials of both phases B and C are negative and substantially equal in magnitude. As the potential of both phases B and C is negative and substantially equal in magnitude, there is no longer a forward potential to maintain holding current through silicon controlled rectifier 33, therefore, this device becomes nonconductive.

The sequence hereinabove described repeats itself as long as the energizing potential is applied and the motor operates at a substantially constant speed until the adjustment of potentiometer 14 is changed.

As the potential of the reference phase is full wave rectified by bridge rectifier 10, there are two potential pulses appearing across Zener diode 36 during each potential cycle and silicon controlled rectifier 50 is extinguished between these pulses.

Therefore, the master trigger signal producing circuitry produces two trigger signals during each potential cycle which are separated by 180 electrical degrees. Assuming that the movable contact of potentiometer 14 is adjusted to a position which will provide a trigger signal at 10 electrical degrees, the master trigger signal producing circuit produces a second trigger signal at 190 electrical degrees. This trigger signal is, of course, applied across the control-cathode electrodes of silicon controlled rectifier 31 through leads 81 and 82. However, at 190 electrical degrees, the potential of phase A is of a negative polarity in respect to that of phase B, as shown by the respective vectors X and Y of FIGURE 3d, therefore, this trigger signal is ineffective to trigger reverse poled silicon controlled rectifier 31 to conduction. The successive trigger signals produced by the slave trigger signal circuits also occur at a time during each potential cycle that the respective silicon controlled rectifiers are reverse poled, therefore, with the connections as indicated in FIGURE 1, these trigger signals may be disregarded.

However, should silicon controlled rectifiers 31 and 32 and 33 be connected in a reverse direction as that shown in FIGURE 1 the trigger signals produced during the first half of the potential cycle would occur at a time when these devices are reverse poled and the trigger signals produced during the second half of each potential cycle would be effective to trigger these devices to conduction in a manner explained hereinabove.

Although only one trigger signal per cycle per phase is required for the operation of the circuit of this invention with Y connected motors, by providing for two trigger signals per cycle per phase, the silicon controlled rectifier switching devices may be poled as shown in FIGURE 1 or in the reverse direction.

The circuitry of FIGURE 1 may also be used with a delta connected configuration as shown in FIGURE 2. With this connection, there are two controllable switching devices corresponding to each phase and are connected in electrical parallel with each other. In FIGURE 2, these switching devices are shown to be silicon controlled rectifier devices which are connected in parallel with each other and in series with the phase winding to which they correspond and are poled in opposite directions. In this figure, silicon controlled rectifiers 41 and 44 correspond to phase A, silicon controlled rectifiers 42 and 45 correspond to phase B and silicon controlled rectifiers 43 and 46 correspond to phase C.

To connect this configuration into the circuitry of FIGURE 1, coils 104 and 105 are magnetically coupled to the primary winding of pulse transformer 76 in place of primary winding 78, coils 106 and 107 are magnetically coupled to the primary winding of pulse transformer 86 in place of secondary winding 88 and coils 108 and 109 are magnetically coupled to pulse transformer 96 in place of secondary coil 97.

Referring to FIGURE 2 and assuming that the movable contact of potentiometer 14 is adjusted to produce a trigger signal at a phase angle of 10 degrees of the selected reference phase, the trigger signal produced is applied across the respective control and cathode electrodes of silicon controlled rectifiers 41 and 44 through respective windings 104 and 105. The potential of each of lines 1, 2 and 3 is represented by the vectors labeled X, Y and Z, respectively, of FIGURE 3a. As the potential of line 1 is positive in respect to that of line 2, silicon controlled rectifier 41 is forward poled and, therefore, this device conducts, completing an energizing circuit for coil A between lines 1 and 2.

120 electrical degrees later at 130 electrical degrees, the potential of each of lines 1, 2 and 3 is represented by the vectors labeled Z, X and Y, respectively, of FIGURE 3a and the trigger signal produced by the slave trigger signal producing circuit comprising transistors 25 and 26 is applied across the respective control-cathode electrodes of silicon controlled rectifiers 42 and 45 through respective coils 106 and 107. As the potential of line 2 is positive in respect to that of line 3, silicon controlled rectifier 42 is forward poled and is, therefore, triggered to conduction. With silicon controlled rectifier 42 conducting, an energizing circuit for coil B is established between lines 2 and 3.

At 150 electrical degrees, the potential of each of lines 1, 2 and 3 is represented by the vectors labeled Z, X and Y, respectively, of FIGURE 3b. As the potentials of lines 1 and 2 are of the same polarity and substantially equal in magnitude, there is an insufficient forward anode-cathode bias to maintain a holding current through silicon controlled rectifier 41, therefore, this device extinguishes.

Figure 3E:
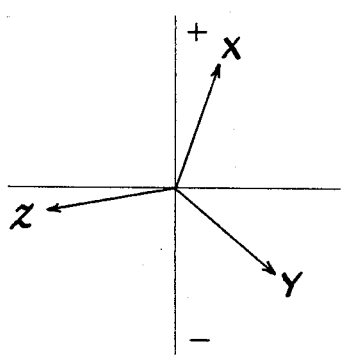

At 190 electrical degrees, the master trigger signal producing circuitry produces a second trigger signal, at the first 10 degrees of the second half of the potential cycle, which is applied to the control-cathode electrodes of silicon controlled rectifiers 41 and 44 through respective coils 104 and 105. The magnitude and polarities of the potentials of lines 1, 2 and 3 is represented in FIGURE 3e by the vectors labeled Z, X and Y, respectively. As the polarity of line 2 is positive in respect to line 1, silicon controlled rectifier 44 is forward poled and is, therefore, triggered to conduction. With silicon controlled rectifier 44 conducting, an energizing circuit for coil A is established between lines 2 and 1.

120 electrical degrees after 130 electrical degree at 250 electrical degrees, the potential of each of lines 1, 2 and 3 is represented oy the vectors labeled Y, Z and X, respectively, of FIGURE 3a and the trigger signal produced by the slave trigger signal producing circuit comprising transistors 29 and 30 is applied across the respective control-cathode electrodes of silicon controlled rectifiers 43 and 46 through respective coils 108 and 109. As the potential of line 3 is positive in respect to that of line 1, silicon controlled rectifier 43 is forward poled and is, therefore, triggered to conduction. With silicon controlled rectifier 43 conducting, an energizing circuit for coil C is established between lines 3 and 1 and the motor begins to rotate.

At 270 electrical degrees, the potential of each of lines 1, 2 and 3 is represented by the vectors labeled Y, Z and X, respectively, of FIGURE 3b. As the potentials of lines 2 and 3 are of the same polarity and substantially equal in magnitude, there is an insufficient forward anode-cathode bias to maintain a holding current through silicon controlled rectifier 42, therefore, this device extinguishes.

120 electrical degrees after 190 electrical degrees at 310 electrical degrees, the potential of each of lines 1, 2 and 3 is represented by the vectors labeled Y, Z and X, respectively, of FIGURE 3e and the trigger signal produced by the slave trigger signal producing circuit comprising transistors 25 and 26 is applied across the respective control-cathode electrodes of silicon controlled rectifiers 42 and 45 through respective coils 106 and 107. As the potential of line 3 is positive in respect to that of line 2, silicon controlled rectifier 45 is forward poled and is, therefore, triggered to conduction. With silicon controlled rectifier 45 conducting, an energizing circuit for coil B is established between lines 3 and 2.

At 330 electrical degrees, the potential of each of lines 1, 2 and 3 is represented by the vectors labeled Y, Z and X, respectively, of FIGURE 3d. As the potentials of lines 1 and 2 are of the same polarity and substantially equal in magnitude, there is an insufficient forward anode-cathode bias to maintain a holding current through silicon controlled rectifier 44, therefore, this device extinguishes.

At an electrical angle of 10 degrees of the next cycle, the trigger signal produced by the master trigger signal circuitry again triggers silicon controlled rectifier 41 to conduction as previously explained.

At 30 electrical degrees of the next cycle, the potential of each of lines 1, 2 and 3 is represented by the vectors labeled X, Y and Z, respectively, of FIGURE 3b. As the potentials of lines 1 and 3 are of the same polarity and substantially equal in magnitude, there is an insufficient forward anode-cathode bias to maintain a holding current through silicon controlled rectifier 43 therefore, this device extinguishes.

120 electrical degrees after 310 electrical degrees at 70 electrical degrees of the next cycle, the potential of each of lines 1, 2 and 3 is represented by the vectors labeled X, Y and Z, respectively, of FIGURE 3e and the trigger signal produced by the slave trigger signal producing circuit comprising transistors 29 and 30 is applied across the respective control-cathode electrodes of silicon controlled rectifiers 43 and 46 through respective coils 108 and 109. As the potential of line 1 is positive in respect to that of line 3, silicon controlled rectifier 46 is forward poled and is, therefore, triggered to conduction. With silicon controlled rectifier 46 conducting, an energizing circuit for coil C is established between lines 1 and 3.

At 90 electrical degrees of the next cycle, the potential of each of lines 1, 2 and 3 is represented by the vectors labeled X, Y and Z, respectively, of FIGURE 3d. As the potentials of lines 2 and 3 are of the same polarity and substantially equal in magnitude, there is an insufficient forward anode-cathode bias to maintain a holding current through silicon controlled rectifier 45, therefore, this device extinguishes.

At an electrical angle of 130 degrees of the next cycle, the trigger signal produced by the master trigger signal circuitry again triggers silicon controlled rectifier 42 to conduction as previously explained.

At 150 electrical degrees, the potential of each of lines 1, 2 and 3 is represented by the vectors labeled Z, X and Y, respectively, of FIGURE 3b. As the potentials of lines 1 and 2 are of the same polarity and substantially equal in magnitude, there is an insufficient forward anode-cathode bias to maintain a holding current through silicon controlled rectifier 41, therefore, this device extinguishes.

The sequence hereinabove described repeats itself as long as the energizing potential is applied and the motor operates at a substantially constant speed until the adjustment of potentiometer 14 is changed.

From this description, it is apparent that the novel speed control system of this invention operates equally well with either Y or delta connected alternating current induction motors and that the motor phase windings are energized over the same electrical conduction angle of each phase for any adjustment of potentiometer 14. That is, the motor windings are cyclically energized as opposed to a pure on-off speed control system in which polyphase energizing potential is applied to the motor in "slugs" of power without regard to the conduction angle of each phase.

To selectively vary the magnitude of the control potential for varying the speed of the motor, a potentiometer 14 has been set forth in the specification and FIGURE 1 of the drawings. It is to be specifically understood that any device, element or component which produces a similar effect in response to temperature, pressure, light intensity, potential, current, torque or any other physical quantity which may be translated by appropriate circuit techniques may be substituted therefor without departing from the spirit of the invention.

Throughout this specification, specific electronic circuitry, components and gating arrangements have been set forth. It is to be specifically understood that other electronic circuitry, components and gating arrangements having similar electrical characteristics may be substituted therefor.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A speed control system for alternating current electric motors of the type having discrete phase windings corresponding to each phase of a compatible alternating current supply potential comprising, means for producing a reference potential in synchronism with a selected phase of said alternating current supply potential, means for producing a control potential which varies in magnitude with changes of motor speed, means for selectively varying the magnitude of said control potential for varying the speed of said motor, means responsive to a difference in magnitude between said reference potential and said control potential for producing a trigger signal at the electrical angle of each potential cycle of each phase of said alternating current supply potential as determined by the magnitude of said difference and controllable switching circuit means corresponding to each phase of said alternating current supply potential for completing an energizing circuit for the corresponding said phase windings in response to respective said trigger signals.

2. A speed control system for polyphase alternating current electric motors of the type having discrete phase windings corresponding to each phase of a compatible alternating current supply potential comprising, means for producing a reference potential in synchronism with a selected phase of said alternating current supply potential, means for producing a control potential which varies in magnitude with changes of motor speed, means for selectively varying the magnitude of said control potential for varying the speed of said motor, means responsive to a difference in magnitude between said reference potential and said control potential for producing a first trigger signal at the electrical angle of each potential cycle of the phase of said alternating current supply potential with which said reference potential is synchronized as determined by the magnitude of said difference, means responsive to said first trigger signal for producing successive trigger signals each corresponding to a respective other phase of said atlernating current supply potential and spaced from each other by an electrical angle equal to the electrical angle between phases of said alternating current supply potential and controllable switching circuit means corresponding to each phase of said alternating current supply potential for completing an energizing circuit for the corresponding said phase windings in response to respective said trigger signals.

3. A speed control system for three phase alternating current electric motors of the type having discrete phase windings corresponding to each phase of a three phase alternating current supply potential comprising, means for producing a reference potential in synchronism with a selected phase of said alternating current supply potential, means for producing a control potential which varies in magnitude with changes of motor speed, means for selectively varying the magnitude of said control potential for varying the speed of said motor, means responsive to the difference in magnitude between said reference potential and said control potential for producing a first trigger signal at the electrical angle of each potential cycle of the phase of said alternating current supply potential with which said reference potential is synchronized as determined by the magnitude of said difference, means responsive to said first trigger signal for producing a second trigger signal spaced one hundred twenty electrical degrees from said first trigger signal, means responsive to said second trigger signal for producing a third trigger signal spaced one hundred twenty electrical degrees from said second trigger signal and controllable switching circuit means corresponding to each phase of said alternating current supply potential for completing an energizing circuit for the corresponding said phase windings in response to respective said trigger signals.

4. A speed control system for three phase alternating current electric motors of the type having the phase windings connected in a delta configuration comprising, the parallel combination of two oppositely poled controllable switching circuit means connected in series with the said phase windings of each phase for completing an energizing circuit for the corresponding said phase windings, each of said controllable switching circuit means having two current carrying electrodes and a control electrode and being of the type which may be triggered to conduction upon the application of an electrical trigger signal to the control electrode thereof, means for producing a reference potential in synchronism with a selected phase of said alternating current supply potential, means for producing a control potential which varies in magnitude with changes of motor speed, means for selectively varying the magnitude of said control potential for varying the speed of said motor, means responsive to the difference in magitude between said reference potential and said control potential for producing a first trigger signal at the electrical angle of each potential cycle of the phase of said alternating current supply potential with which said reference potential is synchronized as determined by the magnitude of said difference, means responsive to said first trigger signal for producing a second trigger signal spaced one hundred twenty electrical degrees from said first trigger signal, means responsive to said second trigger signal for producing a third trigger signal spaced one hundred twenty electrical degrees from said second trigger signal and means for applying said first, second and third trigger signals to the said control electrodes of both of said controllable switching circuit means of respective said parallel combinations of two oppositely poled controllable switching circuit means.

5. A speed control system for three phase alternating current electric motors of the type having the phase windings connected in a Y configuration comprising, three controllable switching circuit means interconnecting the electrical neutral ends of said phase windings for completing an energizing circuit for said phase windings, each of said controllable switching circuit means having two current carrying electrodes and a control electrode and being of the type which may be triggered to conduction upon the application of an electrical trigger signal to the control electrode thereof, means for producing a reference potential in synchronism with a selected phase of said alternating current supply potential, means for producing a control potential which varies in magnitude with changes of motor speed, means for selectively varying the magnitude of said control potential for varying the speed of said motor, means responsive to the difference in magnitude between said reference potential and said control potential for producing a first trigger signal at the electrical angle of each potential cycle of the phase of said alternating current supply potential with which said reference potential is synchronized as determined by the magnitude of said difference, means responsive to said first trigger signal for producing a second trigger signal spaced one hundred twenty electrical degrees from said first trigger signal, means responsive to said second trigger signal for producing a third trigger signal spaced one hundred twenty electrical degrees from said second trigger signal and means for applying said first, second and third trigger signals to the said control electrode of respective said controllable switching circuit means.

6. A speed control system for single phase alternating current electric motors comprising, means for producing a reference potential in synchronism with a single phase alternating current supply potential, means for producing a control potential which varies in magnitude with changes of motor speed, means for selectively varying the magnitude of said control potential for varying the speed of said motor, means responsive to the difference in magnitude between said reference potential and said control potential for producing a trigger signal at the electrical angle of each potential cycle of said single phase alternating current supply potential as determined by the magnitude of said difference and controllable switching circuit means for completing an energizing circuit for the phase windings of said motor in response to said trigger signals.

7. A speed control system for single phase alternating current electric motors comprising, controllable switching circuit means for completing an energizing circuit for the phase windings of said motor, said controllable switching circuit means having two current carrying electrodes and a control electrode and being of the type which may be triggered to conduction upon the application of an electrical trigger signal to the control electrode thereof, means for producing a reference potential in synchronism with a single phase alternating current supply potential, means for producing a control potential which varies in magnitude with changes of motor speed, means for selectively varying the magnitude of said control potential for varying the speed of said motor, means responsive to the difference in magnitude between said reference potential and said control potential for producing a trigger signal at the electrical angle of each potential cycle of said alternating current supply potential as determined by the magnitude of said difference and means for applying said trigger signal to the said control electrode of each of said controllable switching circuit means.

References Cited

UNITED STATES PATENTS

| | | | |
|---|---|---|---|
| 2,579,574 | 12/1951 | Herchenroeder | 318—227 X |
| 2,703,860 | 3/1955 | Large et al. | 318—227 |
| 2,876,406 | 3/1959 | Charbonneaux et al. | 318—227 |

ORIS L. RADER, *Primary Examiner.*

G. Z. RUBINSON, *Assistant Examiner.*